G. H. BUGENHAGEN.
TRANSMISSION MECHANISM.
APPLICATION FILED AUG. 22, 1917.

1,273,326.

Patented July 23, 1918.

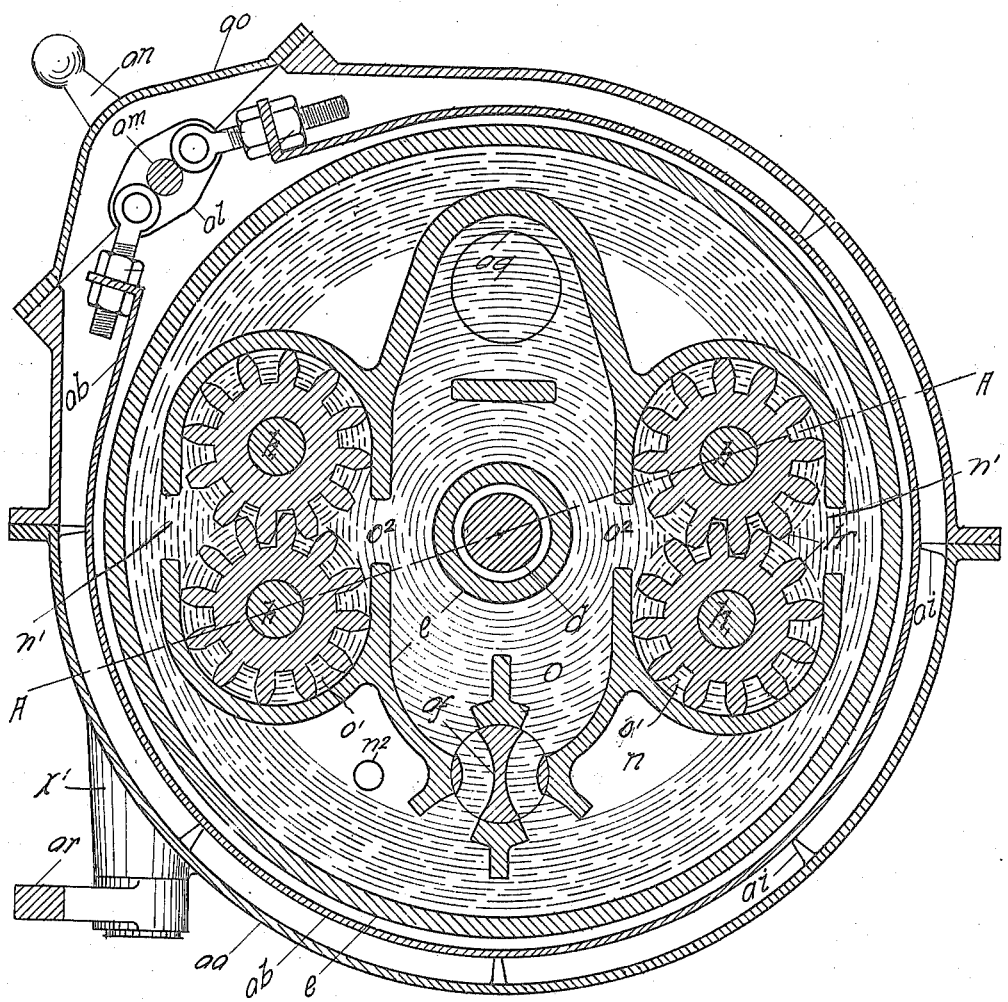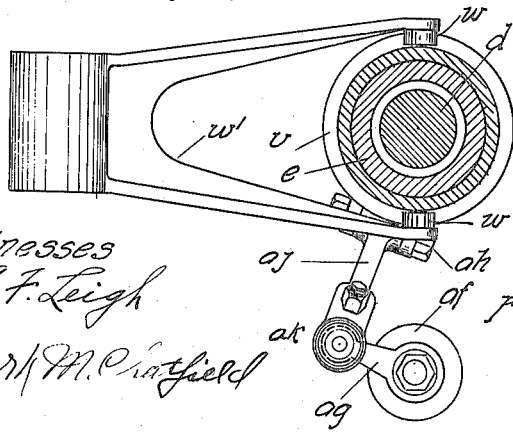

UNITED STATES PATENT OFFICE.

GEORGE H. BUGENHAGEN, OF MINOT, NORTH DAKOTA.

TRANSMISSION MECHANISM.

1,273,326.　　　　　　　Specification of Letters Patent.　　Patented July 23, 1918.

Application filed August 22, 1917. Serial No. 187,698.

*To all whom it may concern:*

Be it known that I, GEORGE H. BUGENHAGEN, a citizen of the United States, residing at Minot, in the county of Ward and State of North Dakota, have invented certain new and useful Improvements in Transmission Mechanism, of which the following is a specification.

This invention relates to transmission gearing of the planetary type in which different speeds are obtained by causing certain parts of the mechanism to operate against a fluid resistance or check, the latter being variable so that any speed, from neutral up to the full speed of the driving element, may be obtained.

The invention has for its object to provide a novel and improved mechanism of the kind stated, and one which is simple in construction and highly efficient in operation.

Other objects and advantages of the invention will be pointed out in the detailed description appearing hereinafter.

Figure 1:
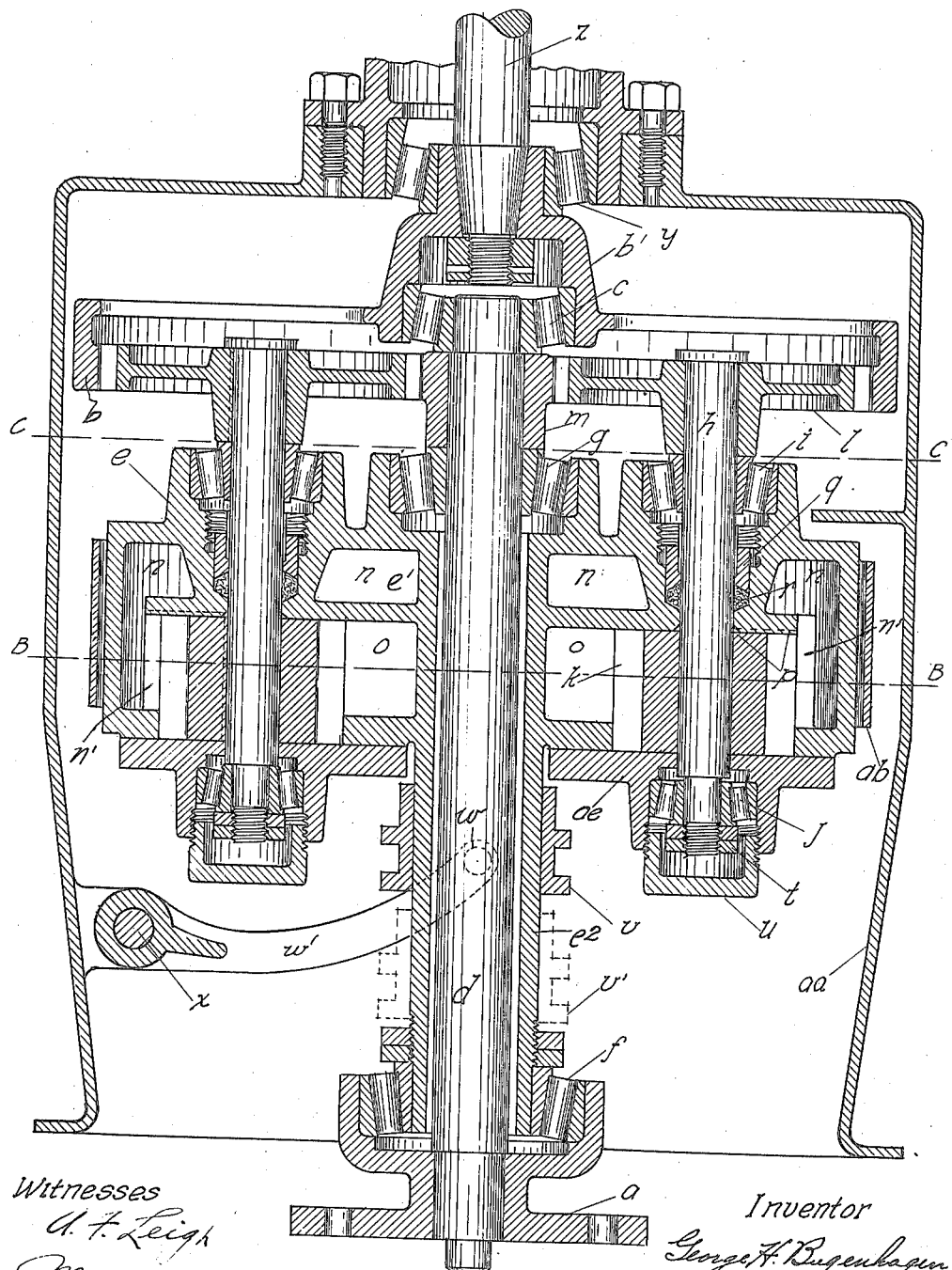
Figure 4:
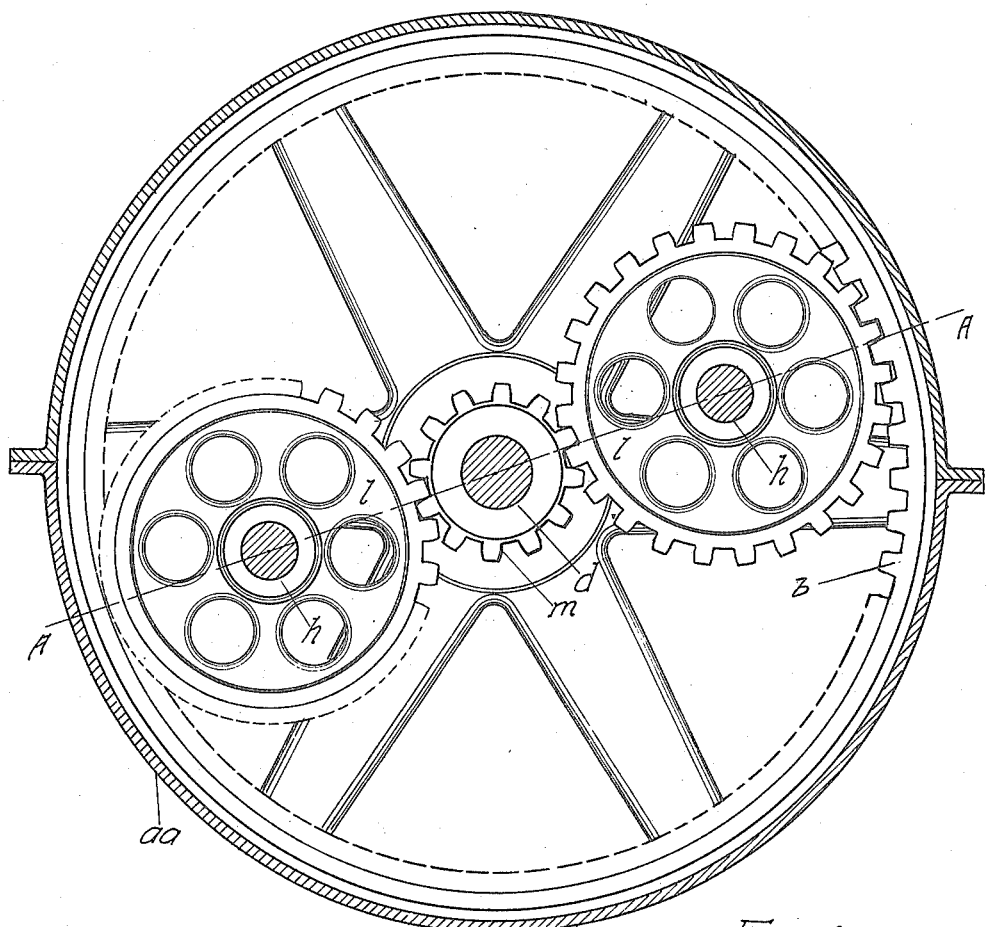

In order that the invention may be better understood, reference is had to the accompanying drawings forming a part of this specification, and in said drawings Figure 1 is the longitudinal section of the mechanism taken on the line A—A of Fig. 4; Fig. 2 is a cross section on the line B—B of Fig. 1; Fig. 3 is a detail view showing the means for operating a throttle valve, and Fig. 4 is a cross section on the line C—C of Fig. 1.

Referring specifically to the drawings, $d$ denotes a driving shaft and $z$ a driven shaft. These two shafts are in axial alinement, and extend into a casing $aa$ which incloses the gear mechanism associated with said shafts. One end of this casing has a bearing $y$ in which the shaft $z$ turns, and in the hub $b'$ of an internal gear $b$ fast on said shaft is a bearing $c$ in which the shaft $d$ turns. On that end of the shaft $d$ which is supported in the bearing $c$ is fastened a drive pinion $m$. On the other end of the shaft $d$ is a flange $a$ for connection of said shaft to the power source. At diametrically opposite points, the pinion $m$ is in mesh with planetary pinions $l$, each of the latter being carried by and fast on a shaft $h$. In the casing $aa$ is located a fluid container or housing $e$ in the form of a drum rotatably mounted in bearings $f$ and $g$, respectively. This drum is arranged coaxially with respect to the shaft $d$, and the latter extends thereinto. At the center of the drum is a hub $e'$ through which the shaft $d$ passes, and at one end of the drum the hub is continued into a hollow shaft like extension $e^2$ through which the shaft $h$ also loosely extends. The flange member $a$ carries the bearing $f$, and the part $e^2$ is journaled in this bearing. The bearing $g$ is carried by the other end of the shaft. Thus, it will be seen that the drum $e$ is free to rotate relative to the shaft $d$, and through a mechanism to be presently described, it may be caused to rotate with said shaft, and also to be held stationary with respect thereto.

In the drum $e$ are located two diametrically opposite rotary pumps, each of which has two rotors $k$ in the form of intermeshing toothed wheels, the teeth or blades of which latter form radial suction and forcing pistons. One of the rotors is fast on a shaft $h'$, and the other rotor is fast on the shaft $h$. The other shaft $h$ is connected to one of the rotors of the other pump. Thus it will be seen that the rotors obtain motion from the shaft $d$ through the pinions $m$ and $l$.

The drum $e$ has a pressure chamber $o$ and a fluid reservoir chamber $n$. In a communicating channel between these two chambers is a throttle valve $af$, and connection between the chambers is also had through a relief valve $aq$. The pressure chamber is formed with two pockets $o'$ in which the pump rotors $k$ work, said pockets having inlets $n'$ from the chamber $n$, and outlets $o^2$ into the chamber $o$. Thus, there is no communication between the chambers $o$ and $n$ except through the pump rotors $k$, and the valves $af$ and $aq$.

The reservoir chamber $n$ will be provided with a filling aperture $n^2$ in one of its end walls, said aperture being located a sufficient distance from the rim of the drum $e$ so that in filling the chamber there will always remain a portion unfilled to form an air cushion for reverse shocks.

The shafts $h$ are supported in bearings $i$ and $j$ carried by the end walls of the drum $e$. The bearings $j$ are closed by caps $u$. Bearings similar to the bearings $j$ are provided for both ends of the shafts $h'$. The ends of the shafts $h$ which carry the pinions $l$ are provided with stuffing boxes $r$ containing screw plugs $q$ for compressing the packing around the shafts, these stuffing boxes being on the end wall of the drum.

The side wall of the pockets $o'$ containing the rotors $k$ have grooves $p$ (shown dotted in Fig. 1) around the shafts $h$, and extending to the suction side of said pockets, for the purpose of relieving the pressure of any fluid on the packing in the stuffing boxes $r$, and thereby reducing the leakage of fluid that might tend to escape through the packing.

One end of the drum $e$ has removable walls $ae$ in order that access to the interior of the drum may be had for the ready assembly of the pump rotors $k$.

The throttle valve $af$ is a rotatable plug having two passageways providing communication between the chambers $o$ and $n$. The valve plug has a radial lever arm $ag$ connected by a ball-and-socket joint $ak$ to a connecting rod $aj$, which latter is connected to a sliding collar $v$ by a pin $ah$, said collar having a peripheral groove, and being slidably mounted on a shaft extension $e^2$. In the groove of the collar seat the lugs $w$ of a shifter yoke $w'$ made fast on a rock shaft $x$ supported in bearings $x'$ on the casing $aa$. A suitable lever arm $ar$ is fastened on the shaft $x$ for actuating the same. When the shaft $x$ is rocked, the collar $v$ is slid on the part $e^2$, and through the connections $ah$, $aj$, $ak$ and $ag$ between said collar and the valve $af$, the latter is operated to open or close entirely or partly.

The relief valve $aq$ is designed to open to a certain predetermined pressure in the chamber $o$, to permit escape of the fluid therefrom into the chamber $n$, and thus prevent overstrains. The valve will be made adjustable to respond to any desired excess pressure.

For obtaining a reverse motion a brake band $ab$ is associated with the drum $e$, said band encircling the rim of the drum externally, and being engageable therewith. The ends of the brake band have suitable connections with a rocker arm $al$ on a shaft $am$ provided with a suitable actuating lever $an$. The casing $aa$ is provided with a removable cover $ao$ so that access to the brake band $ab$, for assembly and removal thereof, may be readily had. On the interior surface of the casing $aa$ are inwardly and radially projecting studs $ai$ inside of which the brake band $ab$ is located. These studs are for the purpose of obtaining a uniform clearance of the brake band throughout the perimeter of the drum $e$.

The operation of the mechanism may be summarized as follows:

When power is applied to the shaft $d$ to turn the same, the pinion $m$, being fast on said shaft, turns the pinions $l$, and the latter operate the pump rotors $k$. If now the valve $af$ is closed entirely, the rotors are locked by the resistance of the fluid confined in the chamber $o$, and hence the drum $e$ starts to turn with the shaft $d$. The pinions $l$, now having no independent rotation, clutch the gear $b$, and the latter therefore turns with the shaft, and as it is fast on the shaft $z$, said shaft is driven at the same rate of speed as the drive shaft $d$. To reduce the rate of speed at which the shaft $z$ is driven, it is necessary only to open the valve $af$ more or less according to the degree of speed reduction desired. When the valve is wide open, the fluid can freely circulate between the chambers $o$ and $n$, and hence no motion is transmitted to the shaft $z$, the pinions $l$ now merely rolling idly around the gear $b$. The rate of speed imparted to the shaft $z$ is inversely proportionate to the ability of the fluid to circulate between the chambers $o$ and $n$, and by operating the valve $af$ any speed from that of the speed of the shaft $d$ to neutral, may be obtained.

To obtain a reverse motion of the shaft $z$, the brake band $ab$ is operated to hold the drum $e$ stationary. The shafts $h$ are now held in an unchangeable position relative to the shaft $d$, i. e.—they do not revolve around said shaft, but they are free to rotate when the valve $af$ is opened, and hence through the pinions $l$ and the gear $b$ the motion of the shaft $d$ is transmitted in a reverse direction to the shaft $z$.

It will be noted that the pumps are located on diametrically opposite sides of the shaft $d$, in view of which the mechanism is perfectly balanced, and no counterweights are required. The pinions $l$ which drive the pumps react on the gear $b$ the exact amount of pressure that is transmitted by the shaft $d$, and with the larger diameter of the gear $b$, it will be seen that the power is increased in proportion to the relative size of the said gear and pinions, and hence a reduction of speed is not accompanied by a drop of power, but by an increase of power, the power being multiplied by the gear and pinions in the same manner as any ordinary gearing process. The speed ratio can be readily varied by simply changing the size of the pinions $l$ and $m$.

The fluid employed may be water, oil, or any other free flowing liquid which will afford a minimum resistance when the gearing is in neutral. Referring to Fig. 2 it will be seen that the cylindrical wall of the drum $e$ forms the outer wall of the chamber $n$, and that the chamber $o$ is inside this chamber nearest to the center of the drum. As the fluid, when the drum is in motion, has a tendency to flow outward toward the periphery of the drum, this being due to the centrifugal force, and the inlets $n'$ are adjacent to and opposite to the drum periphery, it will be seen that a sufficient fluid supply to the pump is assured so long as the chambers $n$ and $o$ contain a sufficient volume of liquid.

The driving shaft $d$, and the driven shaft $z$ are in axial alinement so that there is no loss of power, and the mechanism is given a wide range of application.

I claim:

1. A transmission mechanism comprising a driving member, a driven member, a gear for imparting motion to the driven member, a hollow drum mounted coaxially with respect to the driving member, rotary pumps in the drum located on diametrically opposite sides of its axis, the drum containing fluid reservoir and pressure chambers for the pumps, a valve-controlled connection between said chambers, a drive pinion on the driving member, and pump driving pinions carried by the drum and meshing with said pinion and also in mesh with the aforesaid gear.

2. A transmission mechanism comprising a driving member, a driven member, a hollow drum mounted coaxially with respect to the driving member, rotary pumps in the drum located on diametrically opposite sides of its axis, the drum containing fluid reservoir and pressure chambers, the pressure chamber being located in the center of the drum and having diametrically opposite pockets in which the pumps work, and the reservoir chamber surrounding the pressure chamber and having inlets into the pockets, the pockets having outlets into the pressure chamber, a valve-controlled connection between the reservoir and the pressure chambers, and means for transmitting motion from the drum to the driven member.

3. A transmission mechanism comprising a driving member, a driven member, a planetary gearing between said members, a drum carrying the planetary pinions of said gearing, a pump in the drum driven by said pinions, said drum containing fluid reservoir and pressure chambers for the pump, a valve-controlled connection between the chambers, and a relief valve between the pressure chamber and the reservoir chamber opening to excess pressure in the first-mentioned chamber.

4. A transmission mechanism comprising a driving member, a driven member, a hollow drum carried by the driving member, a rotary pump in the drum, said drum containing fluid reservoir and pressure chambers for the pump, a valve-controlled connection between said chambers, a relief valve between the pressure chamber and the reservoir chamber, and means for transmitting motion of the drum to the driven member.

5. A transmission mechanism comprising a driving member, a driven member, a planetary gearing between the said members, a drum carrying the planetary pinions of said gearing, a pump in the drum driven by said pinions, said drum containing fluid reservoir and pressure chambers for the pump, a valve-controlled connection between the chambers, a brake band associated with the drum for holding the same stationary relative to the driving member, and a casing inclosing the drum and the brake band, said casing having inturned projections on its interior between the outer ends of which and the periphery of the drum the brake band is located.

6. A transmission mechanism comprising a driving member, a driven member, a hollow drum mounted coaxially with respect to the driving member, rotary pumps in the drum located on diametrically opposite sides of its axis, the drum containing fluid reservoir and pressure chambers for the pump, a valve-controlled connection between said chambers, and means for transmitting the motion of the drum to the driven member.

7. A transmission mechanism comprising a driving member, a driven member, a gear for imparting motion to the driven member, a hollow drum mounted coaxially with respect to the driving member, rotary pumps in the drum located on diametrically opposite sides of its axis, the drum containing fluid reservoir and pressure chambers, the pressure chamber being located in the center of the drum and having diametrically opposite pockets in which the pumps work, and the reservoir chamber surrounding the pressure chamber and having inlets into the pockets, the pockets having outlets into the pressure chamber, a valve-controlled connection between the reservoir and the pressure chambers, a drive pinion on the driving member, and pump driving pinions carried by the drum and meshing with said pinion and also in mesh with the aforesaid gear.

In testimony whereof I affix my signature.

GEORGE H. BUGENHAGEN.

Witness:
    MARK M. CHATFIELD.